United States Patent
Kim et al.

(10) Patent No.: US 9,819,879 B2
(45) Date of Patent: Nov. 14, 2017

(54) IMAGE FILTERING APPARATUS AND METHOD BASED ON NOISE PREDICTION USING INFRARED RAY (IR) INTENSITY

(75) Inventors: Yong Sun Kim, Yongin-si (KR); Byong Min Kang, Yongin-si (KR); Do Kyoon Kim, Seongman-si (KR); Kee Chang Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 851 days.

(21) Appl. No.: 13/467,457

(22) Filed: May 9, 2012

(65) Prior Publication Data

US 2013/0016900 A1    Jan. 17, 2013

Related U.S. Application Data

(60) Provisional application No. 61/506,765, filed on Jul. 12, 2011.

(30) Foreign Application Priority Data

Aug. 18, 2011    (KR) .......................... 10-2011-0082088

(51) Int. Cl.
| | |
|---|---|
| *G06T 5/00* | (2006.01) |
| *H04N 5/33* | (2006.01) |
| *G01S 17/89* | (2006.01) |
| *G01S 17/02* | (2006.01) |
| *G06T 5/20* | (2006.01) |

(Continued)

(52) U.S. Cl.
CPC ............. *H04N 5/33* (2013.01); *G01S 17/023* (2013.01); *G01S 17/89* (2013.01); *G06T 5/002* (2013.01); *G06T 5/20* (2013.01); *G06T 5/40* (2013.01); *G06T 5/50* (2013.01); *G06T 2207/10016* (2013.01); *G06T 2207/10028* (2013.01); *G06T 2207/10048* (2013.01); *G06T 2207/20021* (2013.01); *G06T 2207/20076* (2013.01)

(58) Field of Classification Search
None
See application file for complete search history.

(56) References Cited

U.S. PATENT DOCUMENTS

| | | | |
|---|---|---|---|
| 7,408,627 B2 | 8/2008 | Bamji et al. | |
| 7,844,096 B2 * | 11/2010 | Watson | ........................ 382/131 |
| 9,105,082 B2 * | 8/2015 | Kim | ....................... G06T 5/002 |

(Continued)

FOREIGN PATENT DOCUMENTS

| | | |
|---|---|---|
| JP | 2008-51701 | 3/2008 |
| JP | 2010-71976 | 4/2010 |

(Continued)

OTHER PUBLICATIONS

Foix, S.—"Lock-in Time-of-Flight (ToF) Cameras: A Survey"—Mar. 2011, IEEE, pp. 1-11.*

(Continued)

*Primary Examiner* — Bernard Krasnic
(74) *Attorney, Agent, or Firm* — Harness, Dickey & Pierce, P.L.C.

(57) ABSTRACT

Provided is an image filtering apparatus and method that may generate a noise prediction model associated with a depth image, based on an infrared ray (IR) intensity, and thereby predict noise included in a depth image using the generated noise prediction model.

16 Claims, 8 Drawing Sheets

IMAGE FILTERING APPARATUS 100

(51) Int. Cl.
*G06T 5/40* (2006.01)
*G06T 5/50* (2006.01)

(56) References Cited

U.S. PATENT DOCUMENTS

2008/0175457 A1* 7/2008 Watson .................. 382/131
2011/0063437 A1   3/2011 Watanabe et al.

FOREIGN PATENT DOCUMENTS

| JP | 2010-256138 | 11/2010 |
|---|---|---|
| KR | 10-2010-0008107 | 1/2010 |
| KR | 10-2010-0064031 | 6/2010 |
| KR | 10-2010-0065037 | 6/2010 |
| KR | 10-2010-0085675 | 7/2010 |
| KR | 10-2010-0087685 | 8/2010 |
| KR | 10-2010-0132189 | 12/2010 |
| KR | 10-2011-0020720 | 3/2011 |
| KR | 10-2011-0024242 | 3/2011 |
| KR | 2011-0032352 A | 3/2011 |

OTHER PUBLICATIONS

Derek Chan et al., "A Noise-Aware Filter for Real-Time Depth Upsampling", Workshop on Multi-camera and Multi-modal Sensor Fusion Algorithms and Applications, 2008, 12 pages.

Dragos Falie et al., "Noise Characteristics of 3D Time-of-Flight Cameras", IEEE International Symposium on Signals, Circuits and Systems, 2007, 4 pages.

Frederic Garcia et al., "Pixel Weighted Average Strategy for Depth Sensor Data Fusion", Proceedings of 2010 IEEE 17$^{th}$ International Conference on Image Processing, 2010, pp. 2805-2808.

Extended European Search Report issued Oct. 15, 2012 in corresponding European Patent Application No. 12173586.4.

Office Action for the corresponding Korean Patent Application No. 10-2011-0082088 dated May 1, 2017 and English translation thereof.

* cited by examiner 210  220  230

FIG. 4
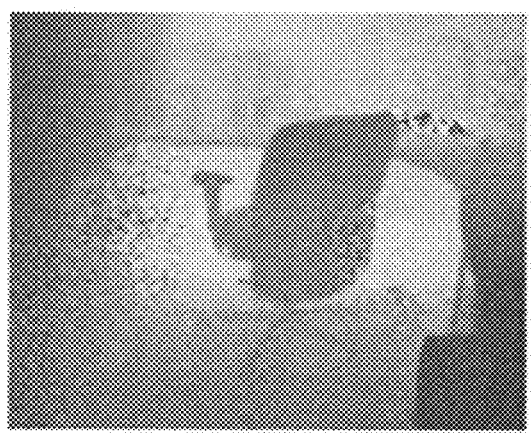
410
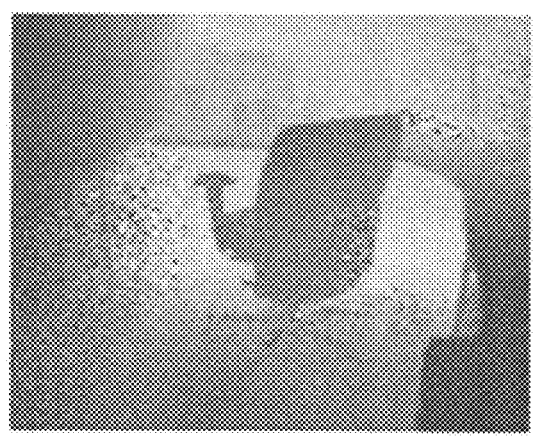
420

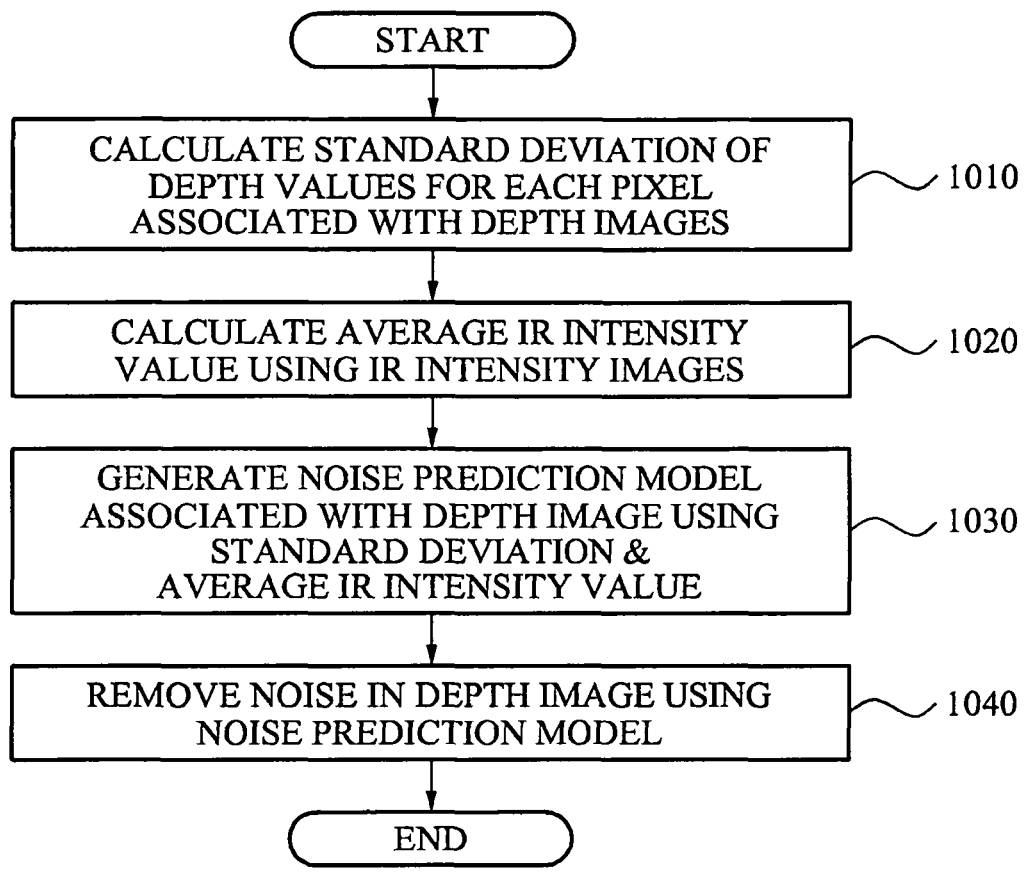

IMAGE FILTERING APPARATUS AND METHOD BASED ON NOISE PREDICTION USING INFRARED RAY (IR) INTENSITY

CROSS-REFERENCE TO RELATED APPLICATIONS

This application claims the priority benefit of U.S. Provisional Patent Application No. 61/506,765, filed on Jul. 12, 2011 in the USPTO and Korean Patent Application No. 10-2011-0082088, filed on Aug. 18, 2011, in the Korean Intellectual Property Office, the disclosures of which are incorporated herein by reference.

BACKGROUND

1. Field

One or more embodiments of the following description relate to filtering technology of removing noise in an image.

2. Description of the Related Art

A depth image employing a time of flight (TOF) scheme may be acquired using a phase difference between an infrared ray (IR) signal emitted from an object and a reflected signal of the emitted IR signal that is reflected from the object and thereby is returned.

However, noise is included in the above acquired depth image and thus, needs to be removed through filtering.

A conventional depth image filtering method may determine a weight of each pixel through a pixel unit comparison and may filter only an adjacent pixel based on the determined weight. Accordingly, there are some constraints in removing noise in the depth image.

SUMMARY

The foregoing and/or other aspects are achieved by providing an image filtering apparatus, including a calculator to calculate a standard deviation of depth values for each pixel using a predetermined number of depth images, and to calculate an average infrared ray (IR) intensity value for each pixel using a predetermined number of IR intensity images, and a model generator to generate a noise prediction model associated with a depth image using the standard deviation and the average IR intensity value.

The image filtering apparatus may further include a depth image acquiring unit to acquire the predetermined number of depth images having a different integration time or distance. The calculator may calculate the standard deviation of depth values for each pixel using the acquired depth images.

The image filtering apparatus may further include an IR intensity image acquiring unit to acquire the predetermined number of IR intensity images including an object with a different color or texture. The calculator may calculate the average IR intensity value for each pixel using the acquired IR intensity images.

The model generator may generate the noise prediction model as an exponential function.

The image filtering apparatus may further include a parameter determining unit to enhance the noise prediction model by changing a filter parameter associated with the noise prediction model.

The parameter determining unit may calculate a noise enhancement fold for each pixel within the depth image as the filter parameter, and may enhance the noise prediction model using the noise enhancement fold.

The parameter determining unit may calculate a search range for each pixel within the depth image by employing a noise enhancement fold as the filter parameter, and may enhance the noise prediction model using the search range.

The parameter determining unit may enhance the noise prediction model by changing, as the filter parameter, one of a similarity, a size, and a weight about a block included in the search range.

The foregoing and/or other aspects are achieved by providing an image filtering apparatus, including a model generator to generate a noise prediction model associated with a depth image, and a noise removal unit to remove noise in the depth image acquired from a depth camera, using the generated noise prediction model.

The model generator may generate the noise prediction model using a standard deviation of depth values for each pixel of depth images acquired from the depth camera, and an average IR intensity value for each pixel of IR intensity images.

The noise removal unit may remove noise in the depth image by changing a filter parameter associated with the noise prediction model.

The foregoing and/or other aspects are achieved by providing an image filtering method, including calculating a standard deviation of depth values for each pixel using depth images, calculating an average IR intensity value for each pixel using IR intensity images, and generating a noise prediction model associated with a depth image using the standard deviation and the average IR intensity value.

The one or more embodiments may include an image filtering apparatus and method that may generate a noise prediction model associated with a depth image based on an IR intensity and may predict noise of the depth image using the noise prediction model.

The one or more embodiments may also include an image filtering apparatus and method that may enhance a noise prediction model by changing a filter parameter of the noise prediction model based on noise included in a depth image.

The one or more embodiments may also include an image filtering apparatus and method that may be applicable to an image signal processor (ISP) as a depth image high precision method.

The one or more embodiments may also include an image filtering apparatus and method that may apply, to an image enhancement or a noise removal, i.e., denoising, a noise prediction model that is generated based on an IR intensity.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 4 illustrates an example of adding noise to a depth image using a noise prediction model according to one or more embodiments;

FIG. 10 illustrates an image filtering method according to one or more embodiments.

DETAILED DESCRIPTION

Figure 1:
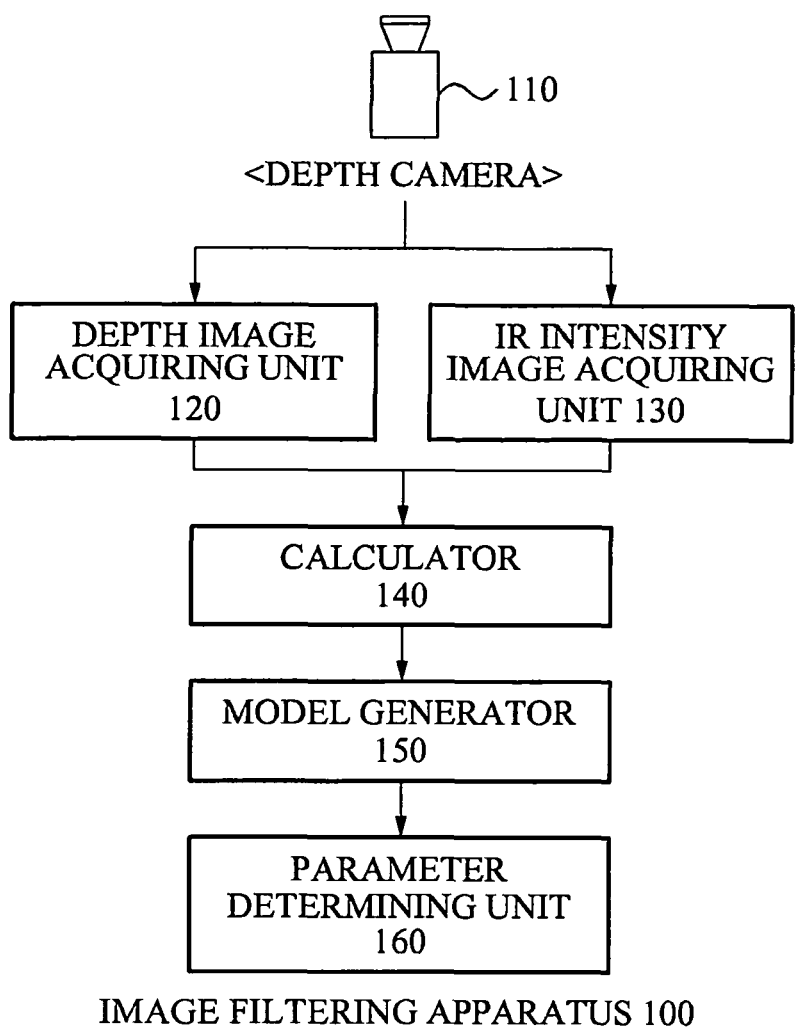
FIG. 1 illustrates a configuration of an image filtering apparatus according to one or more embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of an image filtering apparatus 100 according to one or more embodiments.

Referring to FIG. 1, the image filtering apparatus 100 may include a depth camera 110, a depth image acquiring unit 120, an infrared ray (IR) intensity image acquiring unit 130, a calculator 140, a model generator 150, and a parameter determining unit 160.

According to a time of flight (TOF) scheme, the depth camera 110 may acquire a depth image by emitting, towards an object, an IR signal having a single wavelength and by calculating a phase difference between the emitted IR signal and a reflected signal of the emitted IR signal that is reflected from the object and thereby is returned. In this example, the object indicates a subject and is a target to be photographed.

That is, precision or noise of the depth image may be determined based on a number of electrons occurring within a pixel due to a reflected IR. For example, noise within the depth image may be modeled to a Poisson distribution. When an approximation is performed by applying the Poisson distribution, noise $\Delta R$ within the depth image may have a relationship as expressed by Equation 1.

$$\Delta R \propto \frac{k}{\sqrt{N_{electron}}} \quad \text{[Equation 1]}$$

In Equation 1, k denotes a constant, and $N_{electron}$ denotes the number of electrons, that is, an amount of charges occurring in a pixel due to the received IR.

Referring to Equation 1, noise decreases according to an increase in the number of electrons and noise increases according to a decrease in the number of electrons. In addition, it can be known from Equation 1 that noise may be different for each pixel.

Based on Equation 1, the image filtering apparatus 100 may express a correlation between the IR intensity and the number of electrons as given by Equation 2.

$$N_{electron} \propto \frac{\rho}{dist^2} \propto IR \quad \text{[Equation 2]}$$

In Equation 2, $N_{electron}$ denotes the number of electrons occurring in the pixel due to the received IR, $\rho$ denotes a reflectivity of IR that is reflected from the object, $dist^2$ denotes a distance between the depth camera 110 and the object, and IR denotes an IR intensity value.

The image filtering apparatus 100 may propose an averaging filtering scheme based on an image block by accurately predicting noise using an IR intensity, and by changing a filter parameter based on the predicted noise.

Referring to Equation 1 and Equation 2, noise of the depth image is related to the number of electrons occurring in each pixel due to the received IR. The number of electrons may be in proportion to an IR intensity that may be obtained from the depth camera 110 or a depth sensor (not shown). A function expressing the correlation between the IR intensity and noise within the depth image may be obtained through the following process.

The depth image acquiring unit 120 may acquire the depth image from the depth camera 110. For example, the depth image acquiring unit 120 may acquire a predetermined number of depth images by changing an integration time of the depth camera 110 or a distance between the depth camera 110 and the object. The predetermined number may be determined based on an appropriate number used to generate an excellent noise prediction model. The predetermined number may be N that denotes a natural number, for example, "10,000."

The calculator 140 may calculate a standard deviation of depth values for each pixel using the predetermined number of depth images. The calculator 140 may extract a depth value for each pixel from each of the depth images and calculate the standard deviation of extracted depth values. For example, the calculator 140 may calculate the standard deviation of depth values of pixels that are positioned at the same position within N depth images.

The IR intensity image acquiring unit 130 may acquire, from the depth camera 110, a predetermined number of IR intensity images including an object with a different color or material. The IR intensity image may be generated using an amount of charges that may be obtained from a reflected signal of an emitted IR signal that is returned from the object and thereby is returned. In this example, the predetermined number may be M that denotes a natural number, for example, "10,000."

N and M may have the same value.

The calculator 140 may calculate the average IR intensity value for each pixel using the predetermined number of IR intensity images. The calculator 140 may calculate the average IR intensity value by extracting an IR intensity value for each pixel from each of the IR intensity images, and by averaging the extracted IR intensity values.

The model generator 150 may generate a noise prediction model associated with the depth image using the standard deviation and the average IR intensity value. The model generator 150 may generate the noise prediction model as an exponential function, as expressed by Equation 3.

$$\Delta d(x,y) = \alpha \cdot (IR(x,y))^b + c \quad \text{[Equation 3]}$$

In Equation 3, $\Delta d$ denotes the noise prediction model, each of a, b, and c denotes a constant, and IR denotes an IR intensity value. For reference, a, b, and c may vary according to the depth camera 110.

For example, the model generator 150 may generate the accurate noise prediction model by changing the constants a, b, and c in Equation 3.

The parameter determining unit 160 may efficiently remove noise within the depth image using the noise prediction model. The parameter determining unit 160 may verify whether the noise prediction model is accurately generated by applying the noise prediction model to an actual depth image acquired by the depth camera 110.

Figure 2:
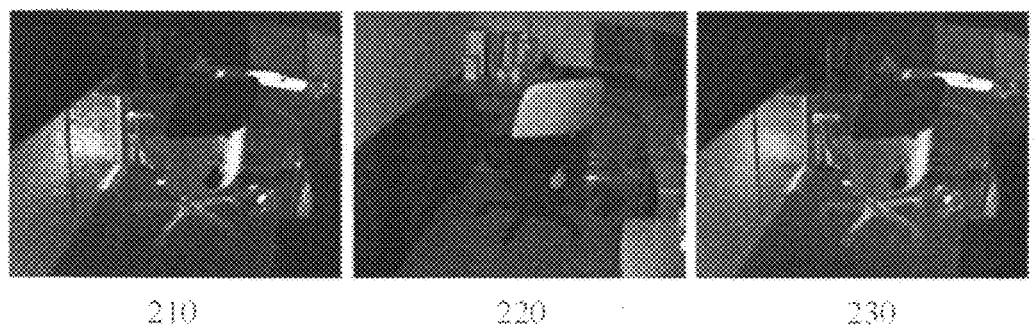
FIG. 2 illustrates an example of predicting noise from an infrared ray (IR) intensity image according to one or more embodiments.

FIG. 2 illustrates an example of predicting noise from an IR intensity image according to one or more embodiments.

Referring to FIG. 2, an image 210 shows noise that is acquired by calculating a standard deviation of depth values for each pixel using N depth images. An image 220 shows an IR intensity that is obtained from an IR intensity image. An image 230 shows noise that is predicted using a noise prediction model. The noise prediction model may be generated using the acquired IR intensity of the image 220. A correlation between the noise included in the image 210 and the noise included in the image 230 is 0.96, which is very close to '1'. Two types of data may be determined to match each other as the correlation becomes closer to '1'. Accordingly, the generated noise prediction model may be relatively accurate.

Figure 3:
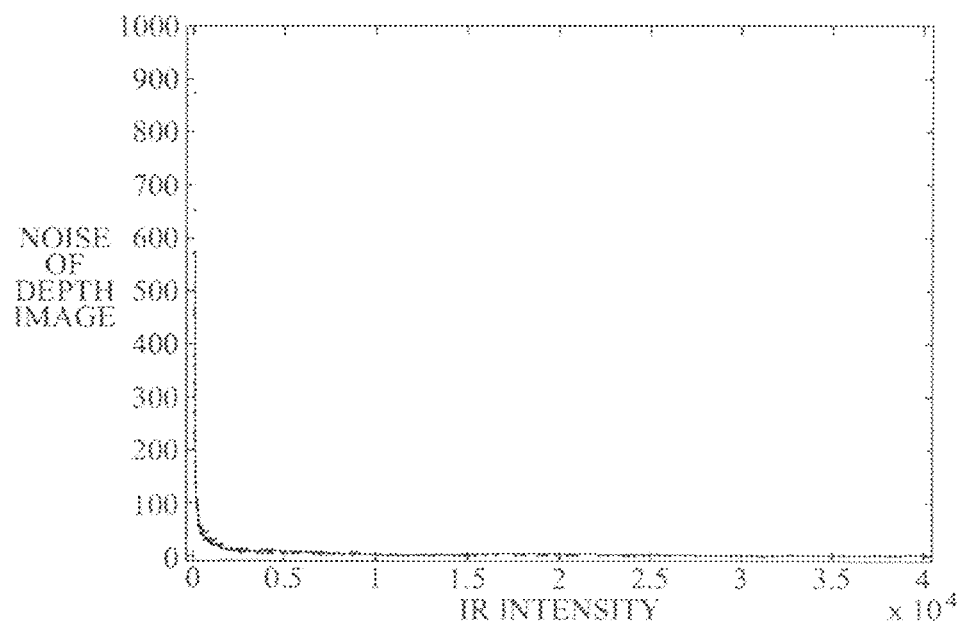
FIG. 3 illustrates an example of a correlation between noise of a depth image and an IR intensity according to one or more embodiments.

FIG. 3 illustrates an example of a correlation between noise of a depth image and an IR intensity according to one or more embodiments.

Referring to a graph of FIG. 3, noise of the depth image is in inverse proportion to the IR intensity. For example, noise may decrease according to an increase in the IR intensity and noise may increase according to a decrease in the IR intensity. In the graph, a solid line indicates noise within the depth image as a generated noise prediction model and a dot indicate noise within the actual depth image. For example, when an error between the predicted noise indicated by the solid line and the actual noise indicated by dots is about 1.7 mm, the parameter determining unit 160 may verify that the relatively accurate noise prediction model is generated.

FIG. 4 illustrates an example of adding noise to a depth image using a noise prediction model according to one or more embodiments.

Referring to FIG. 4, an image 410 corresponds to a simulation depth image in which Gaussian noise is generated using the noise prediction model and is added to a depth image acquired by averaging N depth images. In this example, the acquired depth image may be assumed as a noise-free image.

An image 420 corresponds to a captured depth image in which Gaussian noise is generated using the noise prediction model and is added to the depth image acquired by averaging N depth images.

That is, since random noise is added to the simulation depth image 410 and the captured depth image 420, it may be difficult to quantitatively compare a similarity between the simulation depth image 410 and the captured depth image 420. However, that the simulation depth image 410 and the captured depth image 420 are qualitatively similar to each other may be known. Accordingly, the parameter determining unit 160 may verify that the generated noise prediction model is relatively accurate.

For example, the parameter determining unit 160 may enhance accuracy of the noise prediction model by changing a filter parameter associated with the noise prediction model.

The parameter determining unit 160 may calculate, as the filter parameter, a noise enhancement fold for each pixel within the depth image according to Equation 4:

$$r(x, y) = \frac{\Delta d(x, y)}{d_T}$$ [Equation 4]

In Equation 4, r denotes the noise enhancement fold, $\Delta d$ denotes the noise prediction model, and $d_t$ denotes a noise level.

For example, when noise corresponding to a noise level "10" is included in the depth image, a desired noise level may be set to "1". Therefore, to decrease noise of "10" to noise of "1", ten folds of noise may need to be reduced. When calculating the above process using a random variable, and when 100 is averaged, ten folds of noise may be reduced.

Accordingly, a minimum of $r^2$ pixels may be used to obtain a noise enhancement fold corresponding to r folds. The parameter determining unit 160 may enhance accuracy of the noise prediction model using the calculated noise enhancement fold.

As another example, the parameter determining unit 160 may calculate a search range for each pixel within the depth image by employing the noise enhancement fold as the filter parameter. The search range may indicate a window for filtering noise within the depth image. For example, a width and a height of the search range "s" may be calculated using "r", that is, s=r×r. A case where the width and the height of the search range s is calculated using "r" may be used for a case where a singular value such as edge is not included in a pixel value included in the search range, that is, a case where the pixel value is flat. When the edge is included in the depth image, the parameter determining unit 160 may calculate 1.4×r($\sqrt{2}$×r) as the search range. The parameter determining unit 160 may enhance accuracy of the noise prediction model using the calculated search range.

The search range may be associated with the number of pixels to be averaged, in order to filter noise within the depth image. Filtering may be further performed as according to an increase in the search range. Whether the edge is included in the depth image is unclear and thus, the parameter determining unit 160 may use 1.4 r for a minimum search range.

According to other one or more embodiments, the parameter determining unit 160 may enhance accuracy of the noise prediction model by changing, as the filter parameter, one of a similarity, a size, and a weight with respect to a block included in the search range.

The parameter determining unit 160 may calculate a similarity a between blocks included in the search range.

$$\sigma(x,y) = \Delta d(x,y)$$ [Equation 5]

In Equation 5, $\sigma$ denotes a block similarity and $\Delta d$ denotes the noise prediction model.

Figure 5:
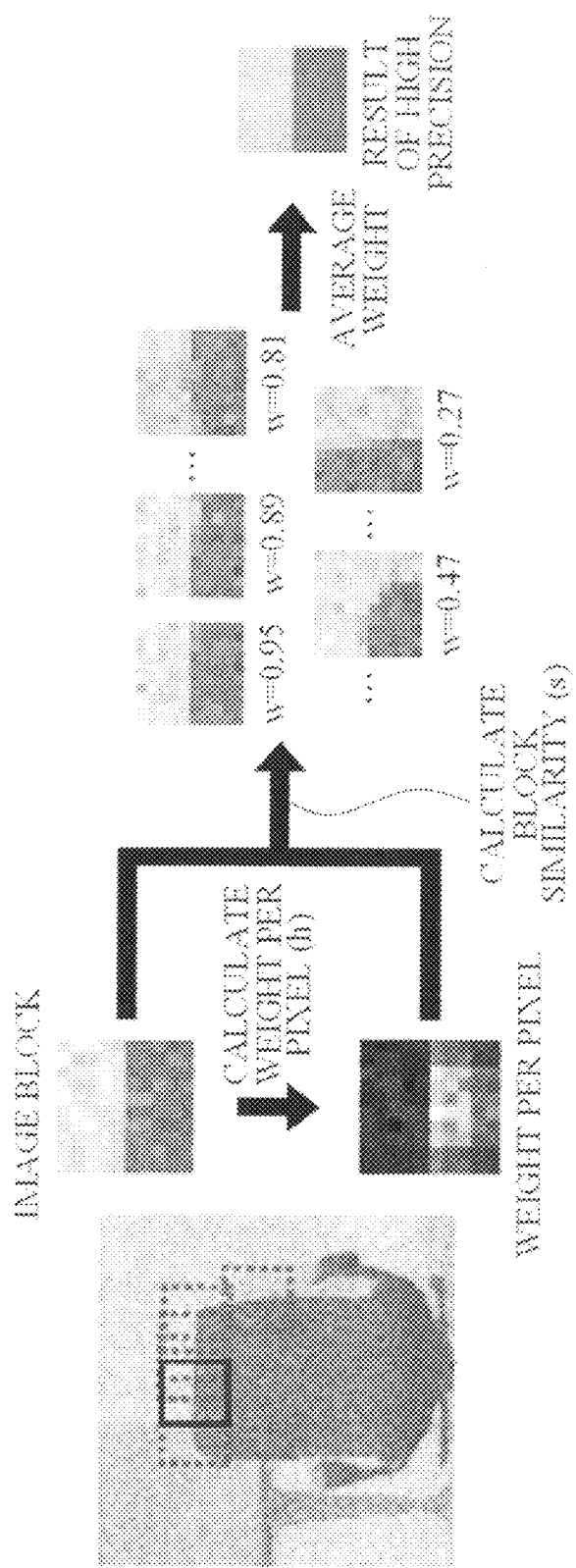
FIG. 5 illustrates an example of calculating a block similarity within a depth image according to one or more embodiments.

FIG. 5 illustrates an example of calculating a block similarity within a depth image according to one or more embodiments.

Referring to FIG. 5, the parameter determining unit 160 may calculate a reliability of a central pixel of a block included in the depth image and a neighbor pixel thereof using a pixel histogram within the block, and may calculate the block similarity using a weight for each pixel based on the reliability.

In general, two blocks included in the search range may be predicted to have a difference corresponding to a noise level. The parameter determining unit 160 may assign a weight to each block based on the calculated block similarity. The parameter determining unit 160 may enhance accuracy of the noise prediction model by variably changing the block similarity.

The parameter determining unit 160 may calculate a block size p included in the search range according to Equation 6.

$$p(x,y) = 2\lfloor 0.1s(x,y)+1 \rfloor + 1$$ [Equation 6]

In Equation 6, p denotes the block size and s denotes the search range.

Figure 6:
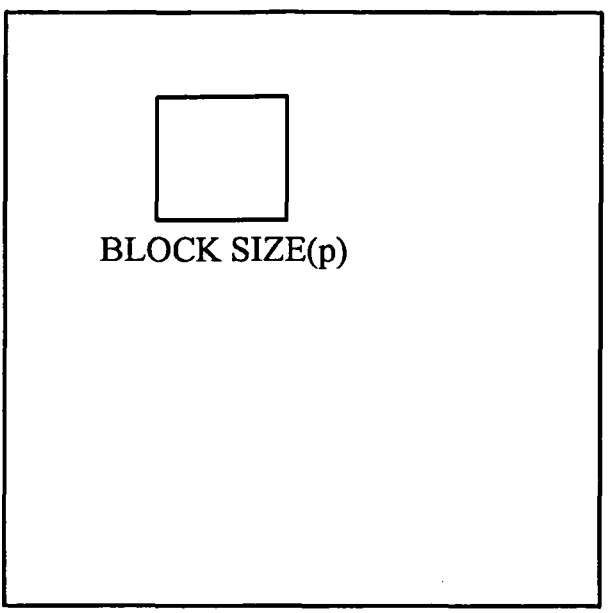
FIG. 6 illustrates an example of indicating a search range and a block size for each pixel within a depth image according to one or more embodiments.

FIG. 6 illustrates an example of indicating a search range and a block size for each pixel within a depth image according to one or more embodiments.

Referring to FIG. 6, the parameter determining unit 160 may determine the block size based on the search range. For example, the parameter determining unit 160 may set the block size to be large when the search range is large, and may set the block size to be small when the search range is small. That is, the size of the search range may be in proportion to the size of the block size. The parameter determining unit 160 may enhance the noise prediction model by variably changing the block size based on the search range.

The parameter determining unit 160 may calculate a weight for a block included in the search range according to Equation 7.

$$w(x,y)=r(x,y) \quad \text{[Equation 7]}$$

In Equation 7, w denotes a block weight and r denotes a noise enhancement fold.

The parameter determining unit 160 may calculate the block weight using the search range and the block similarity.

For example, to further remove noise, the block weight needs to increase according to an increase in the noise enhancement fold. Therefore, the parameter determining unit 160 may enhance the noise prediction model by variably changing the block weight.

Accordingly, the parameter determining unit 160 may efficiently remove noise within the depth image using the enhanced noise prediction model.

Figure 7:
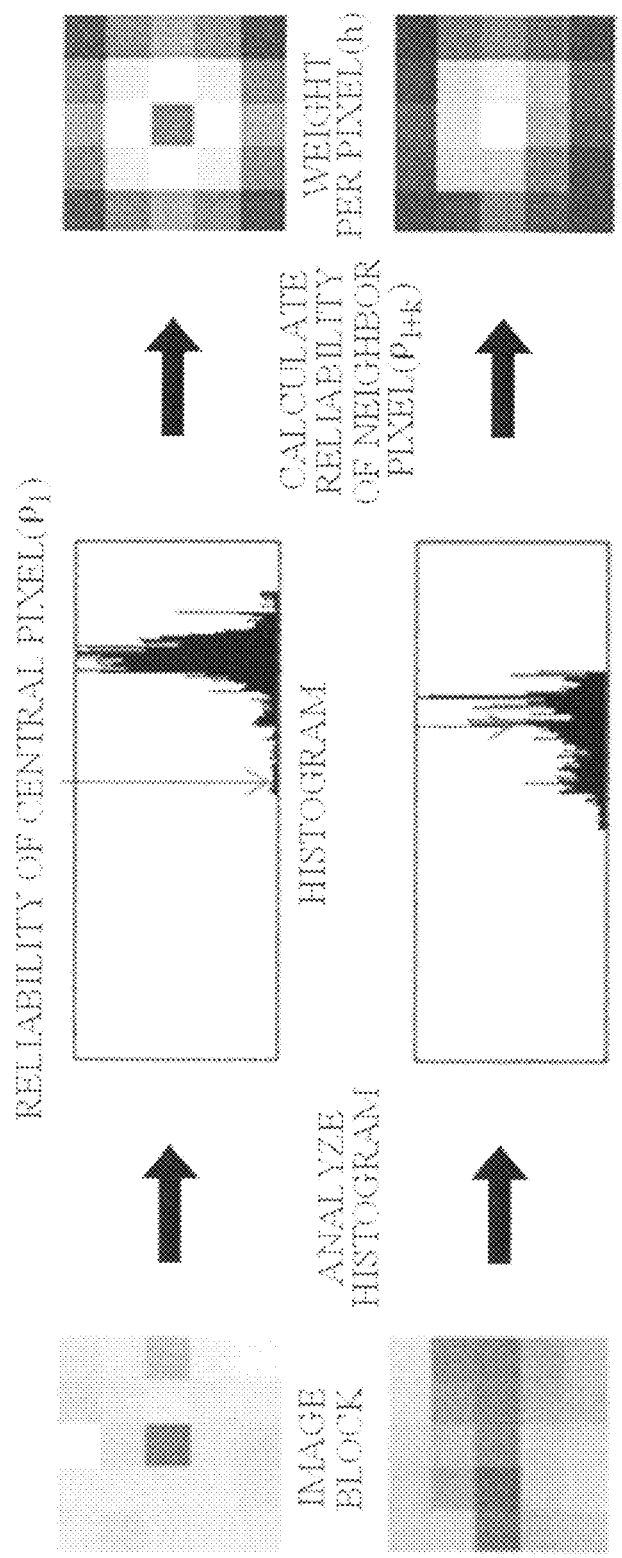
FIG. 7 illustrates an example of calculating a weight for each pixel within a depth image according to one or more embodiments.

FIG. 7 illustrates an example of calculating a weight for each pixel within a depth image according to one or more embodiments.

Referring to FIG. 7, as shown in an upper portion of FIG. 7, when a reliability of a central pixel included in a block is low, the parameter determining unit 160 may remove salt and pepper type noise by decreasing a weight for each pixel. On the contrary, as shown in a lower portion of FIG. 7, when the reliability of the central pixel is high, the parameter determining unit 160 may enhance an edge within an object to be clear by increasing the weight for each pixel.

Figure 8:
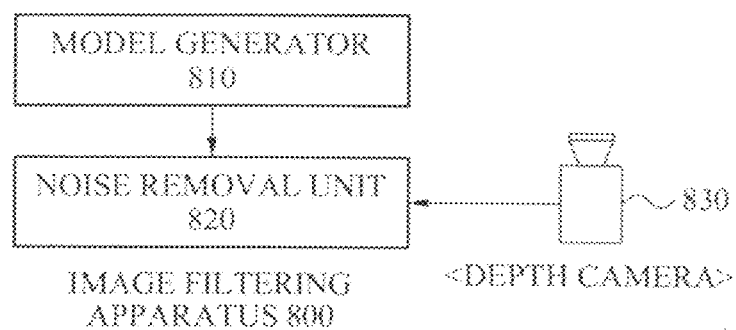
FIG. 8 illustrates a configuration of an image filtering apparatus according to other one or more embodiments.

FIG. 8 illustrates a configuration of an image filtering apparatus 800 according to other one or more embodiments.

Referring to FIG. 8, the image filtering apparatus 800 may include a model generator 810, a noise removal unit 820, and a depth camera 830.

According to a TOF scheme, the depth camera 830 may acquire a depth image by emitting, towards an object, an IR signal having a single wavelength, and by calculating a phase difference between the emitted IR signal and a reflected signal of the IR signal that is reflected from the object and thereby is returned.

The model generator 810 may generate a noise prediction model associated with the acquired depth image. For example, the model generator 810 may generate the noise prediction model using a standard deviation of depth values for each pixel of depth images acquired from the depth camera 830 and an average IR intensity value for each pixel of IR intensity images.

For example, the model generator 810 may calculate the standard deviation of depth values for each pixel using N depth images with a different integration time or distance. Here, N denotes a natural number. The model generator 810 may calculate the average IR intensity value using M IR intensity images including an object with a different color or texture. Here, M denotes a natural number.

The model generator 810 may generate the noise prediction model as an exponential function as given by Equation 3.

The noise removal unit 820 may remove noise in the depth image acquired from the depth camera 830 using the generated noise prediction model. For example, the noise removal unit 820 may enhance accuracy of the noise prediction model by changing a filter parameter associated with the noise prediction model. The noise removal unit 820 may remove noise in the depth image using the enhanced noise prediction model.

Figure 9:
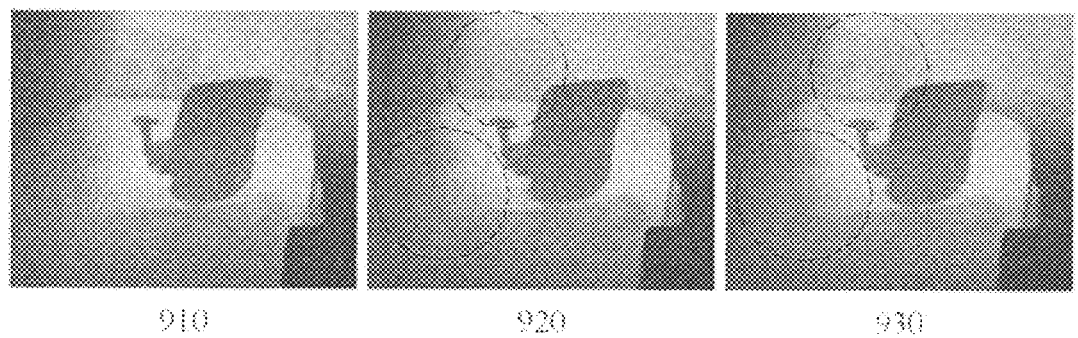
FIG. 9 illustrates an example of removing noise in a depth image using a noise prediction model according to one or more embodiments.

FIG. 9 illustrates an example of removing noise in a depth image using a noise prediction model according to one or more embodiments.

Referring to FIG. 9, an image 910 corresponds to an input depth image, an image 920 corresponds to a conventional image in which noise within the input depth image 910 is removed by fixing a filter parameter for each pixel. An image 930 according to one or more embodiments corresponds to an image in which the noise within the input depth image 910 is removed by variably changing the filter parameter for each pixel.

A first area indicated by an upper dotted circle may correspond to an area in which a relatively small amount of noise is included. Edge remains in the first area of the image 930, whereas the first area of the conventional image 920 is blurred. A second area indicated by a lower dotted circle may correspond to an area in which a relatively large amount of noise is included. A relatively large amount of noise is reduced in the second area of the image 930 compared to the second area of the conventional image 920.

Since the first area includes a relatively small amount of noise, filtering corresponding to, for example, one fold may be required. On the contrary, since the second area includes a relatively large amount of noise, filtering corresponding to, for example, ten folds may be required. Accordingly, an image filtering apparatus according to one or more embodiments may remove noise in the depth image by assigning a different filter parameter for each pixel. For example, by variably changing the filter parameter, the image filtering apparatus may perform filtering corresponding to one fold with respect to the first area in which the relatively small amount of noise is included, and may perform filtering corresponding to ten folds with respect to the second area in which the relatively large amount of noise is included.

In the conventional art, the same filter parameter is applied for each pixel and thus, filtering corresponding to the same value, for example, "five folds" may be performed with respect to both the first area and the second area. Accordingly, the first area may be excessively filtered, whereby a blurring phenomenon may occur. The second area may be less filtered whereby noise may remain.

The image filtering apparatus according to one or more embodiments may efficiently remove noise in the depth image by predicting noise within the depth image, and by removing the predicted noise through changing of the filter parameter.

FIG. 10 illustrates an image filtering method according to one or more embodiments.

The image filtering method may be performed by the image filtering apparatus 100 of FIG. 1 or the image filtering apparatus 800 of FIG. 8.

Referring to FIG. 10, in operation 1010, an image filtering apparatus may calculate a standard deviation of depth values for each pixel using depth images. For example, the image filtering apparatus may acquire N depth images having a different integration time or distance, and may calculate the standard deviation of depth values for each pixel using the acquired depth images. Here, N denotes a natural number.

In operation 1020, the image filtering apparatus may calculate an average IR intensity value for each pixel using IR intensity images. For example, the image filtering apparatus may acquire M IR intensity images including an object with a different color or material, and may calculate the average IR intensity value for each pixel using the acquired IR intensity images. Here, M denotes a natural number.

In operation 1030, the image filtering apparatus may generate a noise prediction model associated with a depth image using the standard deviation and the average IR intensity value. For example, the image filtering apparatus may generate the noise prediction model using an exponential function as expressed by Equation 3.

In operation 1040, the image filtering apparatus may remove noise in the depth image acquired from a depth camera, using the noise prediction model.

For example, the image filtering apparatus may enhance the noise prediction model by changing the filter parameter associated with the noise prediction model. The image filtering apparatus may enhance the noise prediction model by calculating a noise enhancement fold for each pixel within the depth image, and by calculating a search range for each pixel within the depth image using the noise enhancement fold. The image filtering apparatus may change, as the filter parameter, one of a similarity, a size, and a weight with respect to a block included in the search range.

Accordingly, the image filtering apparatus may enhance the noise prediction model by changing the filter parameter and may efficiently remove noise in the depth image using the noise prediction model.

The image filtering method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image filtering apparatus, comprising:
a processor:
configured to calculate depth values of each pixel in depth images, and infrared ray (IR) intensity values of each pixel from IR intensity images;
configured to change a filter parameter for each pixel in the depth images to reduce noise of the depth images based on the depth values and the IR intensity values; and
configured to apply a window determined from the filter parameter to the depth images,
wherein the filter parameter for each pixel in the depth images is determined according to an amount of noise included in a pixel corresponding to the filter parameter,
wherein the processor is configured to change as the filter parameter, a similarity with respect to a block included in the window,
wherein the similarity with respect to the block is determined based on a reliability of a central pixel and a neighbor pixel within the block.

2. The image filtering apparatus of claim 1, wherein the processor is further configured to acquire a predetermined number of depth images having a different integration time or distance, and is further configured to calculate a standard deviation of the depth values of each pixel using the acquired depth images.

3. The image filtering apparatus of claim 1, wherein the processor is further configured to acquire a predetermined number of IR intensity images including an object with a different color or texture, and is further configured to calculate an average of the IR intensity values of each pixel using the acquired IR intensity images.

4. The image filtering apparatus of claim 1, wherein the processor is further configured to generate a noise prediction model associated with a depth image using a standard deviation of the depth values and an average of the IR intensity values.

5. The image filtering apparatus of claim 4, wherein the processor is further configured to generate the noise prediction model as an exponential function.

6. The image filtering apparatus of claim 4, wherein the processor is further configured to calculate a noise enhancement fold for each pixel within the depth image as the filter parameter, and is further configured to enhance the noise prediction model using the noise enhancement fold.

7. The image filtering apparatus of claim 4, wherein the processor is further configured to calculate the window for each pixel within the depth image by employing a noise enhancement fold as the filter parameter, and is further configured to enhance the noise prediction model using the window.

8. The image filtering apparatus of claim 7, wherein the processor is further configured to enhance the noise prediction model by changing, as the filter parameter, one of the similarity, a size, and a weight about the block.

9. An image filtering method, comprising:
calculating depth values of each pixel in depth images, and infrared ray (IR) intensity values of each pixel from IR intensity images;
changing a filter parameter for each pixel in the depth images to reduce noise of the depth images based on the depth values and the IR intensity values; and
applying a window determined from the filter parameter to the depth images,
wherein the filter parameter for each pixel in the depth images is determined according to an amount of noise included in a pixel corresponding to the filter parameter,
wherein the changing of the filter parameter comprises, changing as the filter parameter, a similarity with respect to a block included in the window, wherein the similarity with respect to the block is determined based on a reliability of a central pixel and a neighbor pixel within the block.

10. The method of claim 9, wherein the calculating of the depth values comprises:
    acquiring N depth images having a different integration time or distance, where N denotes a natural number; and
    calculating a standard deviation of the depth values of each pixel using the acquired depth images.

11. The method of claim 9, wherein the calculating of the IR intensity values comprises:
    acquiring M IR intensity images including an object with a different color or texture, where M denotes a natural number; and
    calculating an average of the IR intensity values of each pixel using the acquired IR intensity images.

12. The method of claim 9, further comprising:
    generating a noise prediction model associated with a depth image using a standard deviation of the depth values and an average of the IR intensity values.

13. The method of claim 12, wherein the generating comprises:
    generating the noise prediction model as an exponential function.

14. The method of claim 12, wherein the changing of the filter parameter further comprises:
    calculating a noise enhancement fold for each pixel within the depth image;
    calculating the window for each pixel within the depth image using the calculated noise enhancement fold; and
    enhancing the noise prediction model using the window.

15. The method of claim 14, wherein the enhancing further comprises:
    enhancing the noise prediction model by changing, as the filter parameter, one of the similarity, a size, and a weight with respect to the block.

16. The method of claim 12, wherein the depth image is acquired from a depth camera.

* * * * *